US009998865B2

(12) United States Patent
Jacobs

(10) Patent No.: US 9,998,865 B2
(45) Date of Patent: *Jun. 12, 2018

(54) METHOD FOR PERFORMING DISTRIBUTED GEOGRAPHIC EVENT PROCESSING AND GEOGRAPHIC EVENT PROCESSING SYSTEM

(71) Applicant: NEC LABORATORIES EUROPE GMBH, Heidelberg (DE)

(72) Inventor: Tobias Jacobs, Mannheim (DE)

(73) Assignee: NEC Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/698,684

(22) Filed: Sep. 8, 2017

(65) Prior Publication Data

US 2017/0374512 A1 Dec. 28, 2017

Related U.S. Application Data

(63) Continuation of application No. 14/913,693, filed as application No. PCT/EP2013/072279 on Oct. 24, 2013, now Pat. No. 9,794,743.

(51) Int. Cl.
*H04W 4/02* (2018.01)
*H04L 29/08* (2006.01)
*G06F 9/50* (2006.01)

(52) U.S. Cl.
CPC .......... *H04W 4/021* (2013.01); *G06F 9/5072* (2013.01); *H04L 67/1021* (2013.01);
(Continued)

(58) Field of Classification Search
CPC . G06F 9/46; G06F 9/50; G06F 9/5072; G06F 2209/502; H04L 29/08;
(Continued)

(56) References Cited

U.S. PATENT DOCUMENTS

2002/0196252 A1* 12/2002 Liao .................. G06T 15/40
345/422
2012/0311581 A1* 12/2012 Balmin ................ G06F 9/5066
718/100

(Continued)

OTHER PUBLICATIONS

Yonggang Wang et al: "Research and implementation on spatial data storage and operation based on Hadoop platform", Geoscience and Remote Sensing (IITA-GRS), 2010 Second IITA International Conference on, IEEE, Piscataway, NJ, USA, Aug. 28, 2010 (Aug. 28, 2010), pp. 275-278, XP031777107.

(Continued)

*Primary Examiner* — Chuong A Ngo
(74) *Attorney, Agent, or Firm* — Leydig, Voit & Mayer, Ltd.

(57) ABSTRACT

A method for performing distributed geographic event processing includes defining a geographical state system including: a universe of locations, a family of initial states which assigns an initial state to each location in the universe of locations, a set of geographic input events, each geographic input event including one or more state transition functions that map, for one or more locations in a support of the respective geographic input event, a current state to a pair of a next state and an output event, and a global aggregation function for aggregating sets of output events. The method further includes geographically dividing the universe of locations into a plurality of subsets; and instructing each of a plurality of computational nodes to instantiate a local state system corresponding to a respective one of the subsets.

20 Claims, 4 Drawing Sheets

(52) U.S. Cl.
CPC .......... *H04L 67/1031* (2013.01); *H04L 67/18* (2013.01); *G06F 2209/502* (2013.01)

(58) Field of Classification Search
CPC . H04L 67/1031; H04L 67/1021; H04L 67/18; H04W 4/02; H04W 4/021
See application file for complete search history.

(56) References Cited

U.S. PATENT DOCUMENTS

2013/0060640 A1\* 3/2013 Gadhia .............. G06Q 30/0251
705/14.58
2015/0112773 A1\* 4/2015 Shahraray .......... G06Q 30/0207
705/14.1

OTHER PUBLICATIONS

Ariel Cary et al: "Experiences on Processing Spatial Data with MapReduce", Jun. 2, 2009 (Jun. 2, 2009), Scientific and Statistical Database Management, Springer Berlin Heidelberg, Berlin, Heidelberg, pp. 302-319, XP019119432.

Dean et al: "MapReduce: Simplified Data Processing on Large Clusters", OSDI'04: Sixth Symposium on Operating System Design and Implementation, San Francisco, CA, USA, Dec. 6, 2004 (Dec. 6, 2004), pp. 1-13, XP002503560, Retrieved from the Internet: URL: http://labs.google.com/papers/mapreduce-osdi04.pdf.

\* cited by examiner

METHOD FOR PERFORMING DISTRIBUTED GEOGRAPHIC EVENT PROCESSING AND GEOGRAPHIC EVENT PROCESSING SYSTEM

CROSS REFERENCE TO RELATED APPLICATIONS

This application is a continuation application of U.S. application Ser. No. 14/913,693, filed on Feb. 23, 2016, which is a U.S. National Stage Application under 35 U.S.C. § 371 of International Application No. PCT/EP2013/072279 filed on Oct. 24, 2013, which was published in English on Apr. 30, 2015 as WO 2015/058801 A1 under PCT Article 21(2). The entire contents of these applications are hereby incorporated by reference herein.

FIELD

The present invention relates to a method for performing distributed geographic event processing as well as to a geographic event processing system.

BACKGROUND

Systems for geographic event processing, also called geo-streaming systems, receive streams of input events and produce meaningful output events from them, where input (and possibly output) events are characterized by a geographic location or area. Examples of geographic event processing systems are geo-fencing systems, systems for real-time crowd detection based on GPS location data, or systems for computing continuously updated heat maps from location-tagged temperature sensor measurements arriving over time.

Geographic event processing systems have to perform real-time processing of geospatial data that is often produced with high event rates. Given the high amount of data to be processed, geographic event processing systems typically distribute the event processing among different computational nodes, which in this regard function as a cluster of computers.

For instance, "Map-Reduce" (as described in J. Dean and S. Ghemawat: "MapReduce: Simplified data processing on large clusters," *Communications of the ACM* 51.1 (2008): 107-113) is a well-known framework for performing distributed geographic event processing. Another distributed real-time stream processing system, known as "Storm" (https://github.com/nathanmarz/storm/wiki), takes user-defined computation graphs (so called topologies), deploys them on computers in a cluster to perform scalable stream processing.

Generally, current state-of-the art systems and methods for distributed geographic event processing fall into one of the following categories:

(1) generic-purpose rule based event processing. Such systems solve the load balancing problem by either manually or automatically distributing the event processing rules among the different computational nodes and perform event routing such that each computer receives only the events that are relevant for its processing rules.

(2) distributed stream processing systems where user-defined processing chains are manually or automatically deployed on the different computers of a cluster.

(3) distributed spatial databases.

(4) systems that are tailored to specific event processing tasks like e.g. geo-fencing systems.

(5) generic-purpose systems for automatically distributing processing tasks based on sets of key-value pairs among clusters of computers.

Category (1) systems and methods treat individual rules as atomic in the sense that they cannot be divided among several computers. When there are rules that require more events than a single computer node can handle, such systems cannot be used. The same observation holds for category (2) systems, where only for stateless processing an input stream can be divided among more than one processing node.

Category (3) systems only support a predefined set of read and write operations, but do not support processing.

Category (4) systems perform one specific pre-defined geographic event processing task but are not configurable to perform also other tasks—if other tasks need to be performed the systems need to be re-implemented from scratch, including all aspects of distribution.

Finally, category (5) systems need to represent any state as well as input and output as a discrete and finite set of key-value pairs, which limits their applicability to geographic event processing tasks. Furthermore, category (5) systems, due to their generic purpose, cannot not exploit the geographic nature of geo-streaming operators for achieving increased efficiency.

To summarize, up to now, efficient solutions for distributed geo-streaming systems either have to be designed by hand for each specific geo-streaming task (e.g. for geo-fencing, crowd detection, etc.), or have to use generic-purpose frameworks (e.g. map-reduce or generic stream processing frameworks) that cannot exploit the performance optimizations that would be possible due to the geospatial nature of the data.

SUMMARY

In an embodiment, the present invention provides method for performing distributed geographic event processing. The method includes defining a geographical state system, the geographical state system including: a universe of locations including a plurality of locations, a family of initial states which assigns an initial state to each location in the universe of locations, a set of geographic input events, each geographic input event including one or more state transition functions that map, for one or more locations in a support of the respective geographic input event, a current state to a pair of a next state and an output event, and a global aggregation function for aggregating sets of output events. The method further includes geographically dividing the universe of locations into a plurality of subsets, each subset including one or more locations; and instructing, via a processor, each of a plurality of computational nodes to instantiate a local state system corresponding to a respective one of the plurality of subsets, each local state system including a local aggregation function conforming to the respective subset to which the local state system corresponds.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
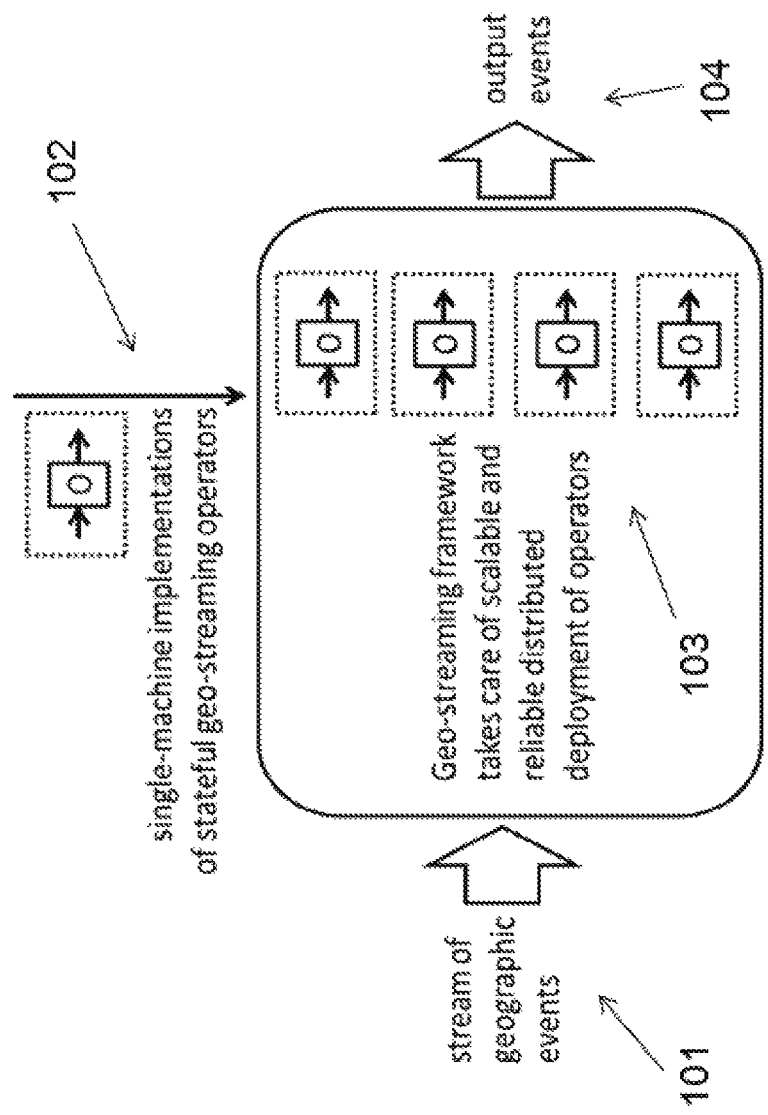
FIG. 1 is a schematic view of an embodiment of the present invention illustrating high-level functionality.

In an embodiment, the present invention provides a method for performing distributed geographic event processing and a geographic event processing system to take advantage of optimizations resulting from the geospatial nature of data, while remaining generic enough to capture a wide range of geo-streaming operators.

In accordance with an embodiment of the invention, a method includes defining a geographical state system for a universe of locations that includes a model for stateful geographic event processing, said model specifying at least a state transition function for transforming geographic input events into output events and a global aggregation function for aggregating sets of output events, providing a local state system for a subset of said universe of locations being defined as a single-machine implementation of said geographical state system and a local aggregation function being defined as an implementation of the global aggregation function of said geographical state system, and by processing means, creating distributed scalable deployments that implement said geographical state system by dividing said universe of locations geographically among different computational nodes and by instantiating on each of said computational nodes an instance of said local state system and said local aggregation function conforming to the subset of said universe of locations assigned to the respective computational node.

Furthermore, in accordance with an embodiment of the invention, a geographic event processing system includes a geographical state system for a universe of locations that includes a model for stateful geographic event processing, said model specifying at least a state transition function for transforming geographic input events into output events and a global aggregation function for aggregating sets of output events, a local state system for a subset of said universe of locations being defined as a single-machine implementation of said geographical state system and a local aggregation function being defined as an implementation of the global aggregation function of said geographical state system, and processing means that are configured to create distributed scalable deployments that implement said geographical state system by dividing said universe of locations geographically among different computational nodes and by instantiating on each of said computational nodes an instance of said local state system and said local aggregation function conforming to the subset of said universe of locations assigned to the respective computational node.

According to an embodiment of the present invention, geo-based distribution and event aggregation have been identified as the two subtasks that are common to a wide range of geographic event processing tasks and therefore have the potential to be implemented by a generic event processing framework. In view of this, the present invention provides a solution that separates between geo-based distribution as well as event aggregation (which can be performed by the processing means for all event processing tasks) on the one hand and the local processing (which is specific to the particular processing task and therefore is to be provided by a user of the system) on the other hand. A user of the system only needs to provide a single-machine implementation of the event processing task, while the framework takes care of all aspects of distribution, load balancing, and, if required, replication. Consequently, compared to systems tailored for specific geo-streaming, a user of the present invention does not have to care about any distributions aspect, which makes of the implementation of new geo-streaming operators more fast and easy.

An embodiment of the present invention provides a flexible and efficient framework for automatically creating scalable distributed deployments of user-defined geo-streaming operators among a cluster of computational nodes in a cloud environment. Unlike generic-purpose systems for automatic deployment, the present invention increases efficiency by systematically exploiting the fact that geographic events have locally limited effects, which enables resource efficient distribution. At the same time the system according to the invention is general enough to support a wide range of different geographic event processing tasks. Importantly, the invention is not limited to stateless processing but can also efficiently handle stateful geographic event processing tasks. In addition, there is no need to explicitly represent the location states, which makes it possible for a user to use the most efficient representation (e.g. in form of spatial index structures like R-trees) and to implement even geographic state systems with infinitely many locations.

According to a preferred embodiment the geographical state system is provided in form of a generic mathematical model that is adapted to cover a wide range of typical geographic event processing tasks. For instance, this can be realized by just defining generically a universe of locations, a set of states, a state transition function and an aggregation function.

With respect to an efficient geographical distribution it may be provided that the processing means divide the universe of locations into a number of tiles, preferably of equal size. The shape of the tiles can be almost arbitrary and may be specified in accordance with the geographical requirements of the respective applications. For each of the tiles, the processing means may instruct one of the computation nodes to instantiate a local state system that will be responsible for the corresponding part of the universe. A tile of the universe may be described by appropriate coordinates (defining e.g. two coordinates like the southwest and northeast corner), and the instantiation may then be done by the processing means by calling the constructor method of the user-provided local state system implementation with these coordinates as parameters.

According to a preferred embodiment, the processing means may be configured to choose which computational node will instantiate which local state system by using a hash function. This ensures that every computational node gets approximately the same number of local state systems assigned and, at the same time, that there are no contiguous clusters of many tiles being all assigned to the same computational node. The latter property ensures that hot-spots with many events will not all have to be handled by the same computational node.

According to another preferred embodiment, the processing means or a dedicated dispatcher may route incoming geographic input events to all computational nodes that host an instance of the local state system whose assigned subset of the universe of locations overlaps with the support of the incoming geographic input events (with the support of an event being defined as the set of locations on which the respective event has an effect, as detailed below). The instances of the local state system may then each compute an output event. The output events from an instance of a local state system may then be aggregated using the implementation of the local aggregation function. The correctness of this approach follows from the associativity of the aggregation function.

In this regard it is important to note that embodiments of the present invention can make use of the local support of geographic events to further reduce the necessary computational effort, by routing the event only to the processing nodes responsible for an area overlapping with the support. In other words, the fact that geographic events have only local support is systematically exploited.

In order to achieve a reliable fault-tolerance, it may be that the same subset of the universe of locations is assigned to more than one computational node and that the respective output events are compared with each other.

The central data type in the context of the present invention is a geographic event. To enable efficient data management, the geographic events may be provided in a data format that consists of a triple of variables specifying the type, the support, and the payload of an event. The event type may be used by the processing means to determine which of the user-defined processing tasks have to be performed upon event arrival. The support of an event may be defined as the set of locations on which the respective event does have an effect. The payload of an event does not have to be considered by the processing means; it can be only the user-defined functions for which the payload is relevant.

According to one embodiment, the process of output event aggregation is implemented as a centralized process. Alternatively, in particular in case of complex aggregation functions, it may be provided that the process of output event aggregation is realized by a processing tree involving two or more of the computational nodes.

In case of mobile geo-fencing applications, implementations of the local state system may keep a spatial index of all mobile users that are in the area assigned to the respective instance of said local state system. Upon arrival of an incoming event that is triggered by a location update of a mobile user, the spatial index may be updated with the new location of the mobile user and via a spatial query the set of mobile users that are candidates for triggering a notification may be figured out.

In case of heat map computations, it may be provided that implementations of the local state system maintain the temperature value history of a location or compute the average temperature of a location.

In the context of the present invention, the term computational node is to be understood in a broad sense and is in no way intended to limit the present invention. In particular, computational nodes may include personal computers (e.g. desktop computers, home computers, laptop computer, personal digital assistants (PDAs), portable computers, and/or tablet PCs), servers, and/or mobile devices with integrated processing capabilities, in particular smartphones.

An important aspect of embodiments of the present invention is the assembly of a local state system implementation and an aggregation function into a distributed implementation of a geographical state system. In view of this it is noted that the present invention is not limited to specific implementations in terms of (a) how to distribute space among the computational/processing nodes or (b) how to organize the aggregation process, or (c) how to replicate in order to achieve fault-tolerance. For any embodiment of the invention in a concrete framework implementation the questions need to be answered of how to geographically distribute the overall universe among the different processing nodes of the cluster and how to organize the process of aggregating the output events from the different local event processing systems. These aspects will be discussed in detail in connection with the description of the following embodiments.

FIG. 1 illustrates a framework in accordance with an embodiment of the present invention where a user only has to provide a single-machine implementation of a geo-streaming operator, which the framework then automatically transforms into a scalable and reliable distributed implementation of the same operator on a cluster of servers in a cloud environment.

In particular, as can be obtained from FIG. 1, which is intended to illustrate the high-level functionality of the invention, the framework receives, as illustrated at 101, streams of geographic input events and, based on the single-machine implementation of the event processing task provided by the user of the framework as illustrated at 102, the framework automatically deploys geographic event processing systems among a cluster of servers (as indicated at 103), and, in the end(as illustrated at 104), provides a set of output events. In particular, the framework takes care of all aspects of distribution, load balancing, and, if required, replication, as will be explained in more detail below.

Figure 2:
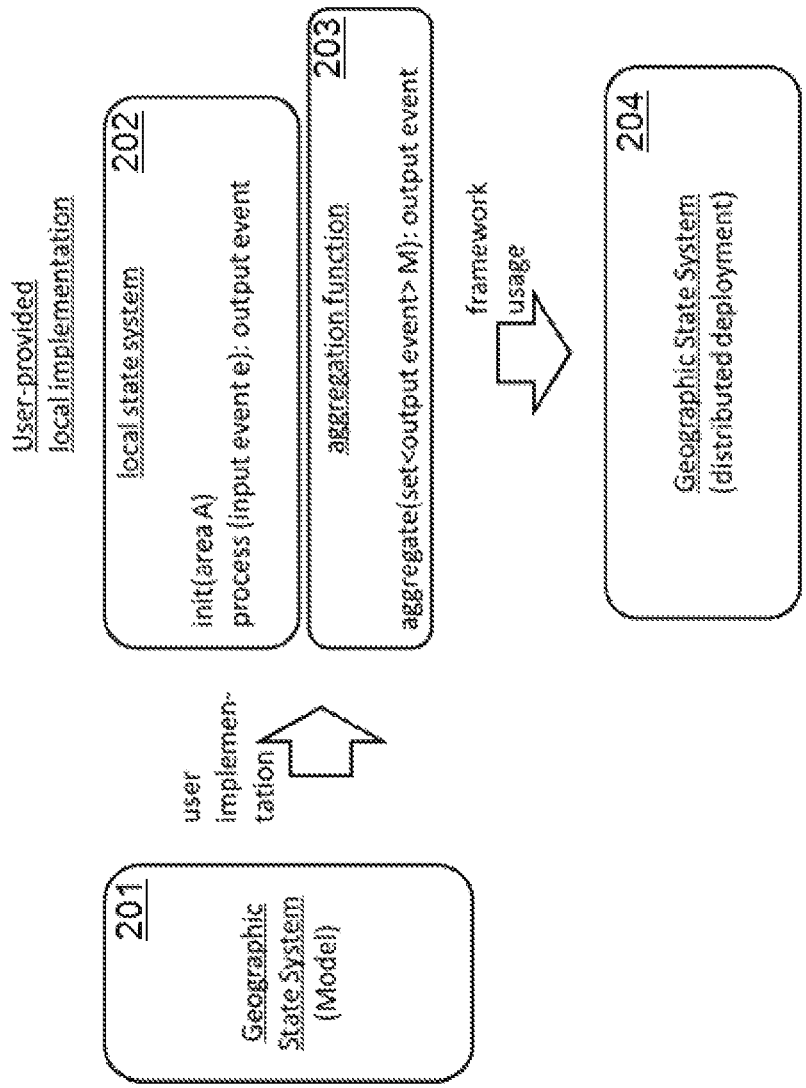
FIG. 2 is a schematic view illustrating the usage and implementation of a distributed geographical state system in accordance with an embodiment of the invention.

FIG. 2 illustrates the usage and implementation of a distributed geographical state system in accordance with an embodiment of the invention. Starting from the mathematical model 201 of a geographical state system, a user of the system just implements the corresponding local state system 202 and aggregation function 203, from which appropriately configured processing means then automatically create a distributed deployment 204 that implements the geographical state system.

As shown on the left side of FIG. 2, the geographical state system is defined as a mathematical model for stateful geographic event processing (also called geo-streaming).

Generally, the model will be defined such that (a) it covers a wide range of typical geographic event processing tasks and (b) it permits to automatically turn single-computer implementations into scalable and robust distributed implementations, despite the stateful nature of the processing.

For instance, a geographical state system, which can roughly be described as the geographically distributed version of a state machine, may consists of:
 a universe U of locations;
 a set S of states;
 a family of initial states $\{s_u | u$ is in $U\}$ which assigns to each location its initial state;
 a set O of output events, containing at least the special event $\epsilon$, the so called null event;
 a set E of input events. Each input event e in E is given as a family of functions $\{e_u | u$ is in $U\}$, and each of these functions maps states to pairs of state and output event, i.e., $e_u: S \rightarrow (S \times O)$; and
 an aggregation function $g: 2^O \rightarrow O$, which aggregates sets of output events into single output events. The aggregation function is associative, i.e. has to satisfy the following two properties:
  $g(\emptyset) = g(\{\epsilon\}) = \epsilon$
  for any two subsets $O_1, O_2$ of O it holds that $g(\{g(O_1), g(O_2)\}) = g(O_1 \cup O_1)$.

A geographical state system (GS) receives input events arriving over time. Upon arrival of an input event, the GS changes its state and returns an output event. More specifically, each location u in U has its own state, initially $s_u$.

Upon arrival of event e, for each location u in U the state transition function $e_u$ is applied to the current state of u to determine the next state of u and the output event produced at location u. The set of all output events generated by all locations is then aggregated into the final output event by means of the aggregation function g.

An event e does not have an effect on a location u in U whenever $e_u(s)=(s, \epsilon)$, i.e. when the state remains the same (i.e. of the state transition function is the identity function) and the null event is produced as output. An important characteristic of an event e is its support, which is defined as the set of locations in U on which e does have an effect. In typical geographical state system embodiments the support of an event is small compared to the universe size. The framework described below will systematically exploit this fact.

In a data model adapted to the above GS, geographic events e that serve as input events could be re-presented by a triple e=(type, support, payload). The event type is used by the processing means, which automatically create scalable and robust implementations of geographical state systems across a cluster of computers, to determine which of the user-defined processing tasks have to be performed upon event arrival. The support of an event is described above in the mathematical model. The payload of an event is not considered by the processing means; it is only the user-defined functions for which the payload is relevant. In contrast to the input events, output events only consist of their payload, so there is no specific information contained in them which the processing means need to understand.

Figure 3:
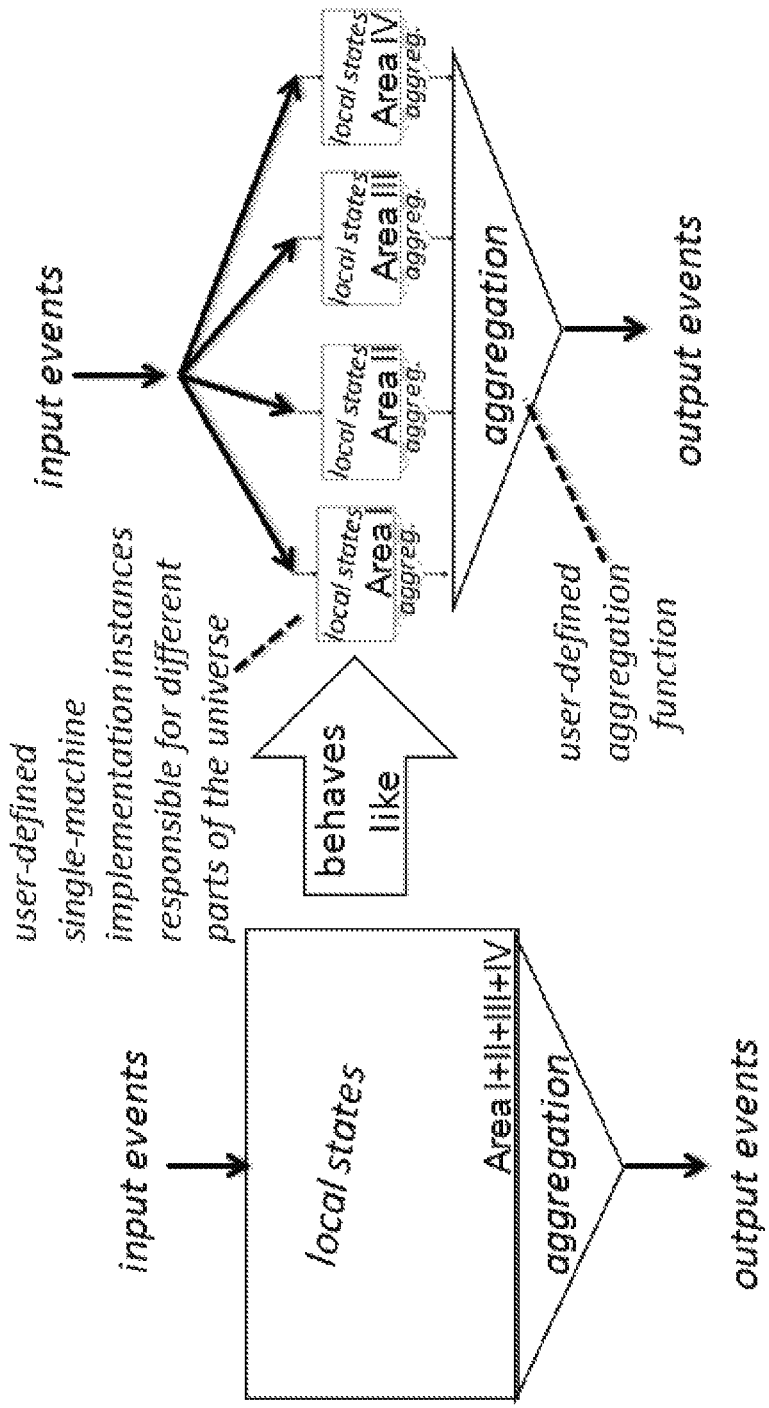
FIG. 3 is a schematic view illustrating the assembly of a local state system implementation in accordance with an embodiment of the invention.

FIG. 3 illustrates the assembly of a local state system implementation in accordance with an embodiment of the invention. Based on the GS as described above, a single-machine implementation has to be provided that "behaves like" the GS in a sense that the correct output events need to be computed. This means that the implementation needs to provide a function whose input parameter is an input event from E, and whose return value is an output event from O and that behaves like the geographical state system whose universe is restricted to a subset A of the universe U. Further, the single-machine implementation has to be configurable with its local universe, i.e. within the area A of locations it takes into account. In other words, a local state system is required, which is a single-machine implementation of the geographical state system that can be instantiated for a subset A of the universe U (e.g. by a parameterized class constructor). In this regard it is important to note that it is up to a user how the location states are internally represented. This means that the local state system implementation does not need explicitly represent the state of each location; it just needs to correctly compute the output event from the input event. Therefore, also geographical state systems with an infinite or even uncountable state space can be realized in the context of the present invention.

In addition to this "local state system", a (single-machine) implementation of the aggregation function needs to be provided. This (local) aggregation function might simply be an implementation of the (global) aggregation function g defined in the geographical state system a user wants to be deployed.

Given these two implementations described above, the processing means can then automatically create scalable deployments by dividing the universe geographically among the different computers in a cluster. On each computer, one or more local state systems are instantiated using the geographical areas assigned to the computer. Upon the arrival of an event e having a matching type, the event is routed by the framework to all computers that host a local state system whose area overlaps with the support of e. The local state system instances then each compute an output event. The output events from all these local state systems are then aggregated using the implementation of the aggregation function. The correctness of this approach follows from the associativity of the aggregation function. Moreover, the process of aggregation does not have to be centralized but can be realized by a processing tree consisting of several computers.

By assigning the same area to more than one processor and comparing the respective output events, fault-tolerance can also be achieved.

Figure 4:
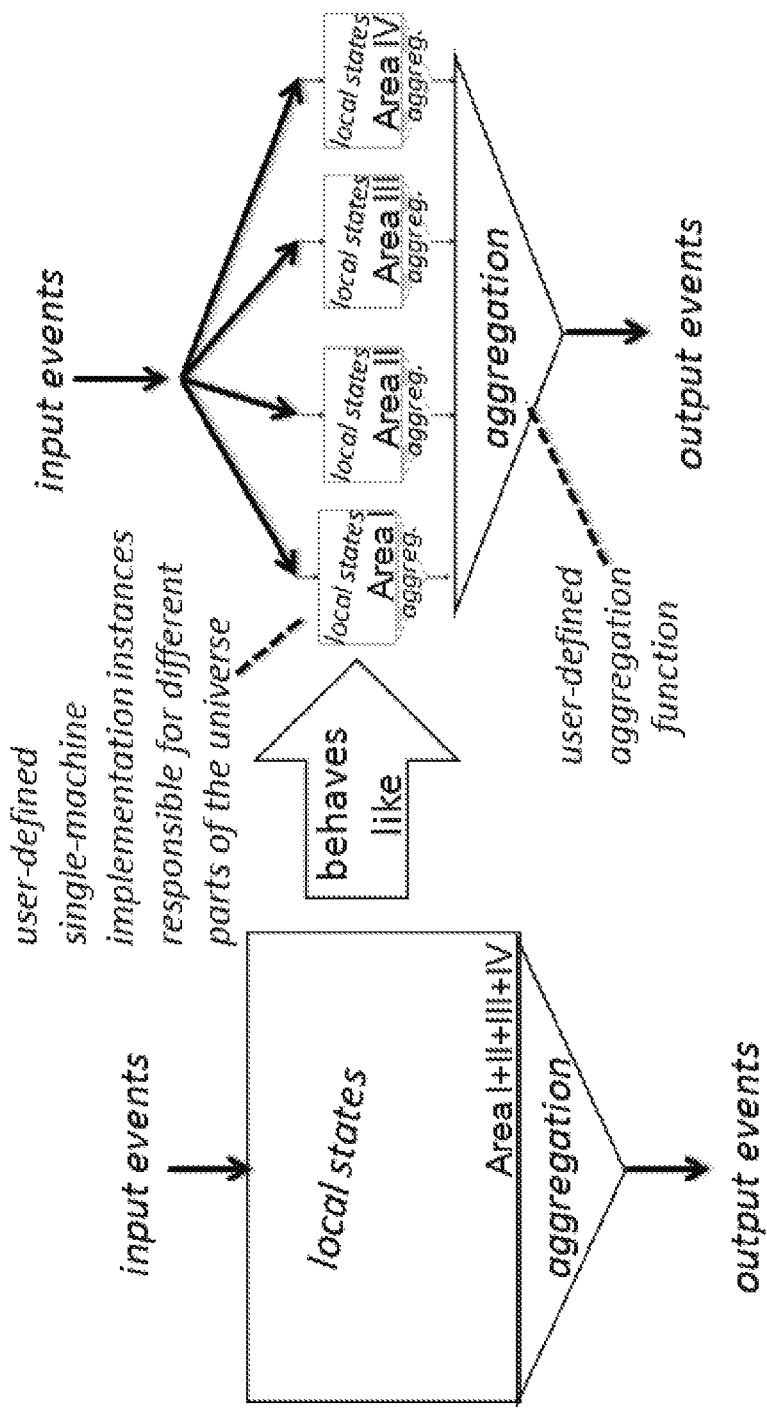
FIG. 4 is a schematic view illustrating the usage and implementation of a distributed geographical state system in accordance with an embodiment of the invention.

FIG. 4 is a schematic view of an embodiment of the invention illustrating the organization of the event flow. According to the illustrated embodiment the role of a dispatcher is introduced. Incoming events first arrive at the dispatcher and are then routed to the servers whose local state systems' universes overlap with the support of the event.

When events arrive at the servers, they are fed into the local state system instances on this server whose assigned part of the universe overlaps with the event support. Each of these local state system instances will return an output event. These output events are aggregated on the server using the user-defined aggregation function and the result is then sent back to the dispatcher.

The dispatcher computes the final output event from the output events it received from the different servers, again using the user-defined aggregation function.

As the functionality of the dispatcher is stateless, several servers can take the dispatcher role and so the dispatcher does not become the bottleneck.

As can be obtained from FIG. 4, the aggregation process may be organized in a tree-like manner, where the aggregation process is shared among several computers. This solution is particularly advisable if the aggregation function is complex.

Hereinafter, two typical geographic event processing tasks—mobile geo-fencing and heat map computation—that are executed by making use of the present invention are described in some more detail. It will be easily appreciated by those skilled in the art that apart from the two examples, which have been chosen completely arbitrary, there is a wide range of different application scenarios.

Mobile Geo-Fencing

In mobile geo-fencing a set of mobile users send location updates to a logically centralized system and wish to get notified when other mobile users are closer to them than some predefined range.

This can be described as a geographical state system, where:
- The state of a location represents the set of mobile users that are close to that location and the set of mobile users that are exactly on that location.
- An incoming event is triggered in case of a location update of one mobile user. The support of the event is the set of locations that are close to the previous or to the new location of that user.
- An outgoing event represents a set of notifications, where each notification announces either that a certain user has become close to some other mobile user, or that a certain user is not close anymore to some other mobile user.
- The state transition function defined by an incoming event e is defined such that whenever the set of users close to a location changes, then a notification about this is added to the aggregation function for each mobile user exactly on that location.

The aggregation function merges sets of notifications into a single set.

The implementation of the aggregation function is straightforward. An implementation of the local state system would keep a spatial index of all users that are in the area A the instance is responsible for. Upon arrival of an event, the spatial index would be updated with the new location of the user and a spatial query finds out the set of mobile users that are candidates for triggering a notification.

Heat Map Computation

A heat map is a mapping of a temperature (or some other parameter) to each location in a given area. A system for computing heat map updates in real time receives temperature (or other parameter) measurements over time. As soon as the temperature in some area has changed by more than a threshold value, a notification about this is sent out, e.g. for updating a graphical representation of the heat map.

This can be described as a geographical state system, where:

The state of a location represents the recent history of temperature measurements for this location. For each measurement the time when it was measured is represented as well as the confidence of the measurement.

Outgoing events are temperature change notifications.

An incoming event is triggered whenever a new temperature measurement arrives. The support of this event is the set of locations for which the measurement is valid. Upon arrival of an event each location in its support adds the measurement to its history, then compares the previous and new current temperature estimation and sends a non-null event if the temperature change is significant.

The aggregation function merges temperature change events into a temperature change event for a larger area.

The implementation of the aggregation function is also here straightforward. An implementation of the local state system could in this case explicitly maintain the temperature value history, or alternatively compute the temperature of a location as a moving average. In the former case only a finite history will be held in memory, and in both realizations a finite resolution of the area into grid points will be applied.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing distributed geographic event processing, comprising:
    defining a geographical state system, the geographical state system including:
        a universe of locations including a plurality of locations,
        a family of initial states which assigns an initial state to each location in the universe of locations,
        a set of geographic input events, each geographic input event including one or more state transition functions that map, for one or more locations in a support of the respective geographic input event, a current state to a pair of a next state and an output event, and
        a global aggregation function for aggregating sets of output events;
    geographically dividing the universe of locations into a plurality of subsets, each subset including one or more locations; and
    instructing, via a processor, each of a plurality of computational nodes to instantiate a local state system corresponding to a respective one of the plurality of subsets, each local state system including a local aggregation function conforming to the respective subset to which the local state system corresponds.

2. The method according to claim 1, further comprising:
    receiving an incoming geographic input event;
    identifying one or more subsets into which the universe of locations is divided having one or more locations that overlap with one or more locations in the support of the received geographic input event; and
    routing, via one of the processor or a dedicated dispatcher, the incoming geographic input event to computational nodes that host an instance of a local state system whose assigned subset of the universe of locations is identified as overlapping with the one or more locations in the support of the received geographic input event.

3. The method according to claim 1, wherein each local state system computes an output event.

4. The method according to claim 1, wherein outputs of each local state system are aggregated by the local aggregation function of the respective local state system.

5. The method according to claim 1, wherein geographic input events are provided in a data format that includes a triple of variables specifying a type, the support, and a payload of the respective geographic input event.

6. The method according to claim 1, wherein each respective local state system maintains a spatial index of all mobile users at or within a vicinity of one or more locations included in respective subset to which the respective local state system corresponds.

7. The method according to claim 1, wherein a state of a location represents a set of mobile users at or within a vicinity of the respective location.

8. The method according to claim 7, wherein each geographic input event in the set of geographic input events is triggered in response to a location update of one or more mobile users in the set of mobile users.

9. The method according to claim 8, wherein each state transition function is defined such that whenever a set of users at or in a vicinity of a location changes as a result of a location update of one or more mobile users, a notification of the change is generated as an output event.

10. The method according to claim 1, wherein the initial state of each location in the universe of location is a temperature.

11. The method according to claim 10, wherein each geographic input event is triggered by a change in temperature of a location by more than a threshold value.

12. The method according to claim 11, wherein each output event is a notification to update a graphical representation of a heat map.

13. The method according to claim 1, wherein a state of a respective location represents a recent history of temperature measurements of the respective location.

14. The method according to claim 13, wherein for each measurement in the history of temperature measurements, a time of measurements and a confidence of the measurement are represented.

15. The method according to claim 13, wherein a geographic input event is triggered whenever a new temperature measurement arrives and a support of the geographic input event is a set of locations for which the measurement is valid.

16. The method according to claim 15, wherein the geographic input event generates a non-null temperature change output event if the new temperature measurement indicates a temperature change that exceeds a threshold value.

17. The method according to claim 16, wherein the global aggregation function merges temperature change output events into a temperature change event for a larger area.

18. A geographic event processing system comprising:
a geographical state system, the geographical state system including:
a universe of locations including a plurality of locations,
a family of initial states which assigns an initial state to each location in the universe of locations,
a set of geographic, input events, each geographic input event including one or more state transition functions that map, for one or more locations in a support of the respective geographic input event, a current state to a pair of a next state and an output event, and
a global aggregation function for aggregating sets of output events; and
a processor configured to geographically divide the universe of locations into a plurality of subsets, each subset including one or more locations, and to instruct each of a plurality of computational nodes to instantiate a local state system corresponding to a respective one of the plurality of subsets, each local state system including a local aggregation function conforming to the respective subset of the universe of locations to which the local state system corresponds.

19. The system according to claim 18, wherein the computational nodes include personal computers, servers, and/or mobile devices with integrated processing capabilities.

20. The system according to claim 18, further comprising a dispatcher configured to:
receive an incoming geographic input event;
identify one or more subsets into which the universe of locations is divided having one or more locations that overlap with one or more locations in the support of the received geographic input event; and
route the received geographic input event to computational nodes that host an instance of a local state system whose assigned subset of the universe of locations is identified as overlapping with the one or more locations in the support of the received geographic input event.

* * * * *